United States Patent Office
3,001,998
Patented Sept. 26, 1961

3,001,998
PHTHALIMIDE DERIVATIVES AND PROCESS
FOR THEIR MANUFACTURE
Heinrich Ruschig, Bad Soden (Taunus), Karl Schmitt
and Ernst Lindner, Frankfurt am Main, and Willi
Meixner, Hofheim (Taunus), Germany, assignors to
Farbwerke Hoechst Aktiengesellschaft vormals Meister
Lucius & Bruning, Frankfurt am Main, Germany, a
corporation of Germany
No Drawing. Filed Mar. 31, 1959, Ser. No. 803,109
Claims priority, application Germany Apr. 5, 1958
6 Claims. (Cl. 260—247.2)

In one of our earlier specifications there are described aromatic dicarboxylic acid imides of the general formula

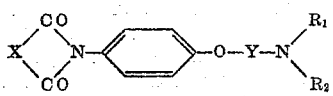

in which X represents a divalent aromatic residue, which may be substituted by halogen, Y represents an alkylene group having at most four carbon atoms, $R_1$ and $R_2$ each represent an alkyl, cycloalkyl or aralkyl group and $R_2$ may also represent a hydrogen atom, the alkyl groups being of low molecular weight, or $R_1$ and $R_2$ together with the nitrogen atom form the residue of a saturated 5- or 6-membered ring, and salts thereof. These compounds possess valuable analgesic and antiphlogistic properties.

The present invention provides phthalimide derivatives of the general formula

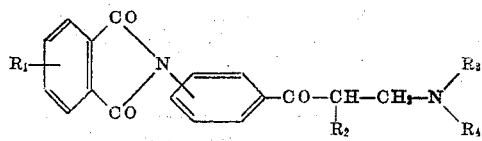

in which $R_1$ represents a hydrogen or halogen atom or a hydroxy or alkoxy group, $R_2$ represents a hydrogen atom or an alkyl group of low molecular weight, $R_3$ and $R_4$ represent alkyl- or aralkyl groups, or $R_3$ and $R_4$ together with the nitrogen atom form the residue of a saturated 5- or 6-membered ring system, and which derivatives also have excellent antiphlogistic and good analgesic properties.

The present invention also provides a process for the manufacture of the above-mentioned phthalimide derivatives, wherein an acyl derivative of an N-phenyl-phthalimide of the general formula

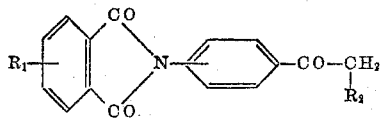

in which $R_1$ and $R_2$ have the meanings given above is reacted with formaldehyde or a compound yielding formaldehyde and with a secondary amine of the general formula

in which $R_3$ and $R_4$ have the meanings given above; or an acylaniline of the general formula

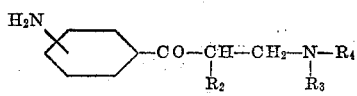

in which $R_2$, $R_3$, $R_3$ and $R_4$ have the meanings given above, is reacted with a phthalic acid of the general formula

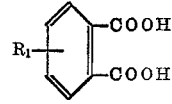

in which $R_1$ has the meaning given above or with a functional derivative of such a phthalic acid in known manner.

As acyl derivatives which may be used in the process of this invention being capable of condensing with formaldehyde and a secondary amine, there may be mentioned, for example, 2- 3- or 4-phthalimido-acetophenone, 4-phthalimido-propiophenone, 4 - phthalimido - butyrophenone, 3-phthalimido-valerophenone, 4-phthalimido-isovalerophenone, 4-(3-chloro-phthalimido)-acetophenone, 4-(3-hydroxy-phthalimido)-acetophenone, 4-(4-chlorophthalimido)-acetophenone or 3-(4-methoxy-phthalimido)-propiophenone. Examples of secondary amines, capable of condensing with formaldehyde or with a compound yielding formaldehyde and with an acyl derivative of the N-phenylphthalimide, are dimethylamine, diethylamine, di-sec.-butylamine, pyrrolidine, morpholine, piperidine, 2-methyl-piperidine, dibenzylamine, diphenylethylamine and benzylmethylamine.

Examples of acylanilines having basically substituted acyl residues, as may be used for the reaction with reactive derivatives of phthalic acid, are 4-amino-β-dimethylamino-propiophenone, 4-amino-β-piperidino-propiophenone, 3-amino-α-methyl-β-diethylamino-propiophenone, 4-amino-β-piperidino-butyrophenone, 2-amino-β-morpholino-valerophenone and 4-amino-β-(2-methyl-piperidino)-α-ethyl-caprophenone.

Examples of reactive derivatives of phthalic acid, which may be used for reaction with the aniline derivatives having an amino-acylated phenyl nucleus are, phthalic anhydride, 4-oxy-phthalic anhydride, halogenated phthalic anhydrides, such, for example, as 4-chloro-phthalic anhydride, 3-methoxy-phthalic acid dichloride, 3-chloro-phthalic acid dichloride, 4-ethoxy-phthalic acid dimethyl ester, 4-ethoxy-phthalic acid diethyl ester, 3-methoxy-phthalic acid dibutyl ester or 3-chloro-phthalic acid dipropyl ester.

The condensation of the acyl derivative of an N-phenyl-phthalimide with formaldehyde or a compound yielding formaldehyde, such as para-formaldehyde, and with a secondary amine is carried out in known manner by the Mannich-base-condensation reaction. Advantageously, glacial acetic acid is used as solvent and the formaldehyde used is an excess of para-formaldehyde which is easy to handle. Advantageously, the secondary amine is used in the form of a hydrohalide, so that the hydrohalide of the condensation product is obtained directly as end-product. It is also advantageous to mix the starting materials in glacial acetic acid and to stir the mixture thus obtained for a few hours at a slightly raised temperature. Preferably, the reaction is conducted at a temperature within the range of 80° C. to 120° C. Furthermore, it is advantageous to add the para-formaldehyde portionwise throughout the reaction. The reaction product is obtained in the form of its hydro-halide which crystallises out after cooling the reaction solution, sometimes only after concentrating the solution, and in certain cases only after the addition of alcohol and ether. The product is purified in the usual manner by recrystallisation from a suitable solvent, such, for example, as acetic acid, alcohol or water. The reaction of the acylaniline, having a basically substituted acyl residue, with a phthalic acid or a reactive derivative thereof is also conducted by a method in itself known. Thus, by heating the free phthalic acid or a reactive derivative thereof, advantageously the anhydride, with the aniline derivative at a temperature usually above 100° C., water is split off and the corresponding phthalimido compound is obtained. An especially advantageous form of the process is to boil the aminoacylated aniline in the form of its hydrochloride under reflux with phthalic anhydride in glacial acetic acid. The reaction usually takes about 2 hours, and the product is obtained directly in the form of its hydrochloride. It is also possible to carry out the process by reacting the acylated aniline containing a free amine group with phthalic anhydride in alcohol, acetone, dioxane, or dimethyl formamide usually at a temperature below 100° C. so that the corresponding phthalamidic acid is obtained which then undergoes ring closure to the phthalimide by heating it at a temperature usually above 100° C., advantageously by boiling it in glacial acetic acid. The reaction products, which are thus obtained in solution as their acetic acid salts, can either be isolated as such by reduction in the volume of solution, or, by treating with other organic or inorganic acids may be converted into other salts. For this purpose, suitable organic acids are, for example, malonic acid, propionic acid, lactic acid, succinic acid, tartaric acid, maleic acid, fumaric acid, citric acid, malic acid, salicylic acid, hydroxy-ethane-sulphonic acid, aceturic acid, or ethylene-diamine-tetra-acetic acid, and inorganic acids are, for example, hydrohalic acids, such as hydrochloric acid or hydrobromic acid, and sulphuric acid, phosphoric acid or amidosulphonic acid.

The new compounds obtained by the process of the present invention are useful medicaments, which are distinguished by having antiphlogistic and good analgesic properties. 4-phthalimido-$\beta$-piperidino-propiophenone hydrochloride, for example, has twice the analgesic activity of dimethyl-amino-phenyl-dimethyl-pyrazolone. Tests carried out on the mouse for the determination of analgesia by the method devised by Wolff, Hardy, Goodell (see Journal of Chemical Investigation, vol. 19, pages 649 and 659 (1940) and vol. 20, page 63 (1941)) showed that with a dose of 40 mg./kg. s.c. the activity was considerably prolonged, and that with a dose of 50 mg./kg. s.c. pain was substantially overcome. For the purpose of oral administration, good analgesia is obtained with a dose of 100 mg./kg. An antiphlogistic action is already observed in the rat with a dose of 50 mg./kg.

The new compounds of this invention can be used as such or in some cases advantageously in the form of their acid addition salts, or if desired, in admixture with the usual pharmaceutical carriers, such as starch, lactose, tragacanth, or magnesium stearate, for the preparation of pharmaceuticals, or made up into various forms suitable for administration, such as tablets, dragees, capsules, drops, suppositories, or ampoules. The preparations are preferably administered per os.

The following examples illustrate the invention:

Example 1

53 grams of 4-phthalimido-acetophenone, 60 grams of piperidine hydrochloride and 10 grams of para-formaldehyde were stirred with 400 cc. of glacial acetic acid for 2 hours at 90° C. A further 10 grams of para-formaldehyde were then added to the mixture which was stirred for a further 1½ hour at the same temperature. The reaction solution was then cooled and, after the addition of 100 cc. of alcohol and one litre of ether, 61.5 grams of 4-phthalimido-$\beta$-piperidino-propiophenone hydrochloride were obtained, which, after recrystallisation from water, melted at 228 to 229° C.

Example 2

53 grams of 4-phthalimido acetophenone were heated with 30 grams of pyrrolidine hydrochloride and 9 grams of para-formaldehyde in 200 cc. of glacial acetic acid for 3 hours at the boil under reflux. On cooling the reaction solution, 50 grams of 4-phthalimido-$\beta$-pyrrolidino-propiophenone hydrochloride crystallised out, which, after recrystallisation from alcohol and water, had a melting point of 227° C.

Example 3

56 grams of 4-phthalimido propiophenone were stirred with 60 grams of piperidine hydrochloride and 10 grams of para-formaldehyde in 500 cc. of glacial acetic acid at 90° C., until a clear solution was obtained (ca. 30 minutes). A further 10 grams of para-formaldehyde were then added and stirring was continued at 85–90° C. for a further 2 hours. The reaction solution was concentrated to half its volume under reduced pressure and then allowed to cool. 66.4 grams of 4-phthalimido-$\alpha$-methyl-$\beta$-piperidino-propiophenone hydrochloride were obtained, which, after recrystallisation from water, had a melting point of 205–206° C.

Example 4

53 grams of 4-phthalimido-acetophenone, 60 grams of diethylamine hydrochloride and 10 grams of para-formaldehyde in 500 cc. of glacial acetic acid were stirred for 30 minutes at 90° C., and then a further 10 grams of para-formaldehyde were added to the reaction mixture. After stirring for a further 2 hours at about 90° C., 250 cc. of glacial acetic acid were distilled off under water pump vacuum. After cooling the reaction solution, 35.7 grams of 4-phthalimido-$\beta$-diethylamino-propiophenone hydrochloride crystallised out, which, after recrystallisation from glacial acetic acid, had a melting point of 200–202° C.

By using 60 grams of morpholine hydrochloride instead of diethylamine hydrochloride in the above experiment, 4-phthalimido-$\beta$-morpholino-propiophenone hydrochloride was obtained, which had a melting point of 220–221° C.

Example 5

A mixture comprising 53 grams of 3-phthalimido-acetophenone, 60 grams of piperidine hydrochloride and 10 grams of para-formaldehyde was stirred for 2½ hours in 400 cc. of glacial acetic acid at 90–95° C. On cooling the reaction solution, 53.3 grams of the hydrochloride of 3-phthalimido-$\beta$-piperidino propiophenone were obtained which, after recrystallisation from water, had a melting point of 220° C.

Example 6

15 grams of 4-amino-$\beta$-piperidino propiophenone dihydrochloride and 7.5 grams of phthalic anhydride were heated under reflux in 100 cc. of glacial acetic acid for 2 hours. On cooling, 9.3 grams of a salt crystallised out which was identical with the product obtained in Example 1, namely, 4-phthalimido-$\beta$-piperidino propiophenone hydrochloride. By using the monohydrochloride instead of the dihydrochloride of 4-amino-$\beta$-piperidino propiophenone, 4-phthalimido-$\beta$-piperidino-propiophenone hydrochloride was obtained in a yield of about 90% of theory.

Example 7

60 grams of 4-(4-chloro-phthalimido)-acetophenone, 60 grams of piperidine hydrochloride and 10 grams of para-formaldehyde were stirred for 2 hours in 750 cc. of glacial acetic acid at about 90° C. On cooling, 64 grams of 4-(4-chloro-phthalimido)-$\beta$-piperidino-propiophenone hydrochloride were obtained which, after recrystallisation from glacial acetic acid, had a melting point of 232° C. to 234° C.

We claim:

1. A member of the group consisting of phthalimide derivatives of the formula

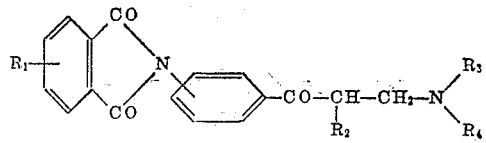

in which $R_1$ is a member of the group consisting of hydrogen and chlorine, $R_2$ is a member of the group consisting of hydrogen and alkyl groups of one to three carbon atoms and $R_3$ and $R_4$ are members of the group consisting of alkyl groups of one to four carbon atoms and, together with the nitrogen atom, members of the group consisting of pyrrolidine, piperidine and morpholine, and non-toxic acid addition salts of these compounds.

2. The compound of the formula

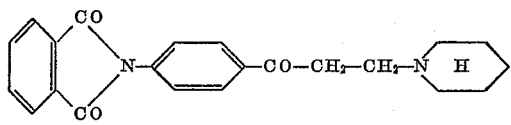

3. The compound of the formula

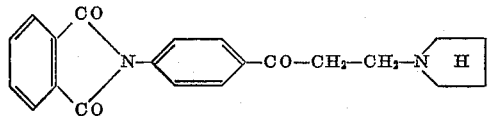

4. The compound of the formula

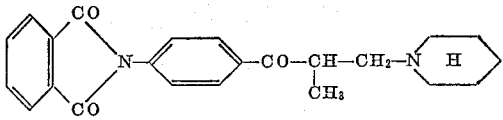

5. The compound of the formula

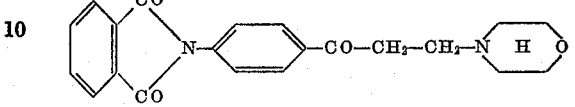

6. The compound of the formula

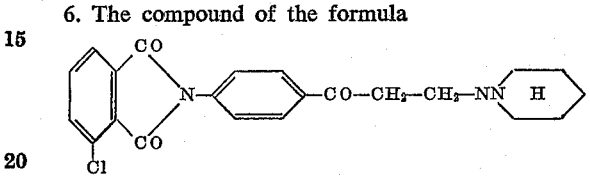

References Cited in the file of this patent
Ghosh et al.: J. Indian Chem. Soc., vol. 30 (1953), pages 863–6.